(12) United States Patent
Cho et al.

(10) Patent No.: US 9,832,634 B2
(45) Date of Patent: Nov. 28, 2017

(54) METHOD FOR PROVIDING MULTI-NUMBER SERVICE

(71) Applicant: KONA I CO., LTD., Seoul (KR)

(72) Inventors: Chung Il Cho, Seoul (KR); Sung Hwan Kim, Gyeonggi-do (KR); Young Min Son, Gyeonggi-do (KR); Chang Yong Choi, Seongdong-gu (KR)

(73) Assignee: KONA I CO., LTD., Seoul (KR)

( * ) Notice: Subject to any disclaimer, the term of this patent is extended or adjusted under 35 U.S.C. 154(b) by 0 days.

(21) Appl. No.: 15/510,931

(22) PCT Filed: Feb. 23, 2015

(86) PCT No.: PCT/KR2015/001711
§ 371 (c)(1),
(2) Date: Mar. 13, 2017

(87) PCT Pub. No.: WO2016/080595
PCT Pub. Date: May 26, 2016

(65) Prior Publication Data
US 2017/0245137 A1   Aug. 24, 2017

(30) Foreign Application Priority Data

Nov. 21, 2014 (KR) .................... 10-2014-0163571
Dec. 9, 2014  (KR) .................... 10-2014-0176104
(Continued)

(51) Int. Cl.
*H04B 1/38*    (2015.01)
*H04W 8/18*    (2009.01)
(Continued)

(52) U.S. Cl.
CPC .......... *H04W 8/183* (2013.01); *H04B 1/3816* (2013.01); *H04W 8/22* (2013.01); *H04W 8/28* (2013.01)

(58) Field of Classification Search
CPC ......... H04W 8/183; H04W 8/22; H04W 8/28; H04B 1/3816
(Continued)

(56) References Cited

U.S. PATENT DOCUMENTS 8,761,832 B2   6/2014  Jeung
8,850,340 B2   9/2014  Lee et al.
(Continued)

FOREIGN PATENT DOCUMENTS

EP    2461613 A1      6/2012
JP    2002368871 A   12/2002
(Continued)

OTHER PUBLICATIONS

International Search Report in International Application No. PCT/KR2015/001711, filed Feb. 23, 2015.

*Primary Examiner* — Nay A Maung
*Assistant Examiner* — Angelica M Perez
(74) *Attorney, Agent, or Firm* — Saliwanchik, Lloyd & Eisenschenk

(57) ABSTRACT

A method for providing a multi number service using a universal integrated circuit card (UICC) comprises the steps of: according to a command received from the outside of a UICC, selecting any one subscriber identification information set among a plurality of subscriber identification information sets stored in a memory allocated to a subscriber identification information set managing application; and activating the selected subscriber identification information set.

10 Claims, 15 Drawing Sheets

(30) Foreign Application Priority Data

Dec. 10, 2014 (KR) ........................ 10-2014-0177563
Dec. 11, 2014 (KR) ........................ 10-2014-0178192

(51) Int. Cl.
*H04B 1/3816* (2015.01)
*H04W 8/22* (2009.01)
*H04W 8/28* (2009.01)

(58) Field of Classification Search
USPC ........................................ 455/558
See application file for complete search history.

(56) References Cited

U.S. PATENT DOCUMENTS

| | | | |
|---|---|---|---|
| 9,185,547 | B2 | 11/2015 | Jung |
| 2013/0095795 | A1 | 4/2013 | Shi |
| 2013/0324089 | A1 | 12/2013 | Kim et al. |
| 2016/0020802 | A1* | 1/2016 | Lee .................. H04B 1/3816 455/558 |
| 2016/0021529 | A1* | 1/2016 | Park .................. H04W 12/08 455/410 |
| 2016/0088096 | A1* | 3/2016 | Quiriconi .............. H04W 4/001 709/219 |
| 2016/0142906 | A1* | 5/2016 | Park .................. H04W 8/205 455/419 |

FOREIGN PATENT DOCUMENTS

| | | |
|---|---|---|
| JP | 2006121335 A | 5/2006 |
| JP | 2008-271121 A | 11/2008 |
| JP | 2013-527656 A | 6/2013 |
| KR | 1020060027065 A | 3/2006 |
| KR | 100779369 B1 | 11/2007 |
| KR | 100862749 B1 | 10/2008 |
| KR | 1020100058688 A | 6/2010 |
| KR | 1020110001027 A | 1/2011 |
| KR | 1020110086306 A | 7/2011 |
| KR | 20130136173 A | 12/2013 |
| WO | WO-2011/036484 A2 | 3/2011 |
| WO | WO-2013/179531 A1 | 12/2013 |

* cited by examiner

[Fig. 1]
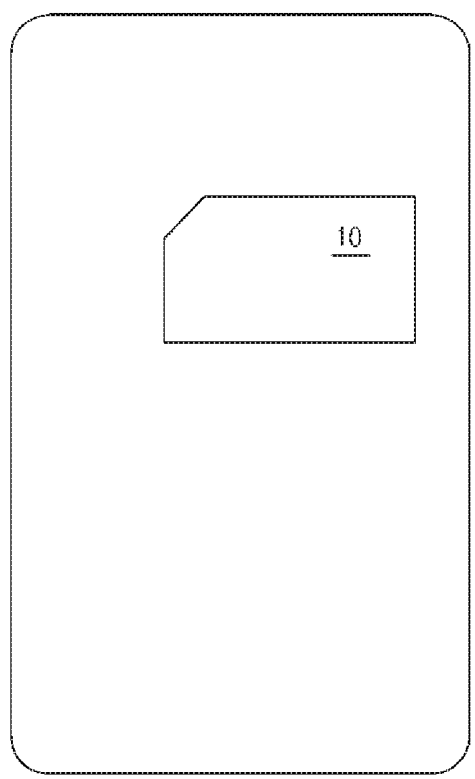

[Fig. 2]
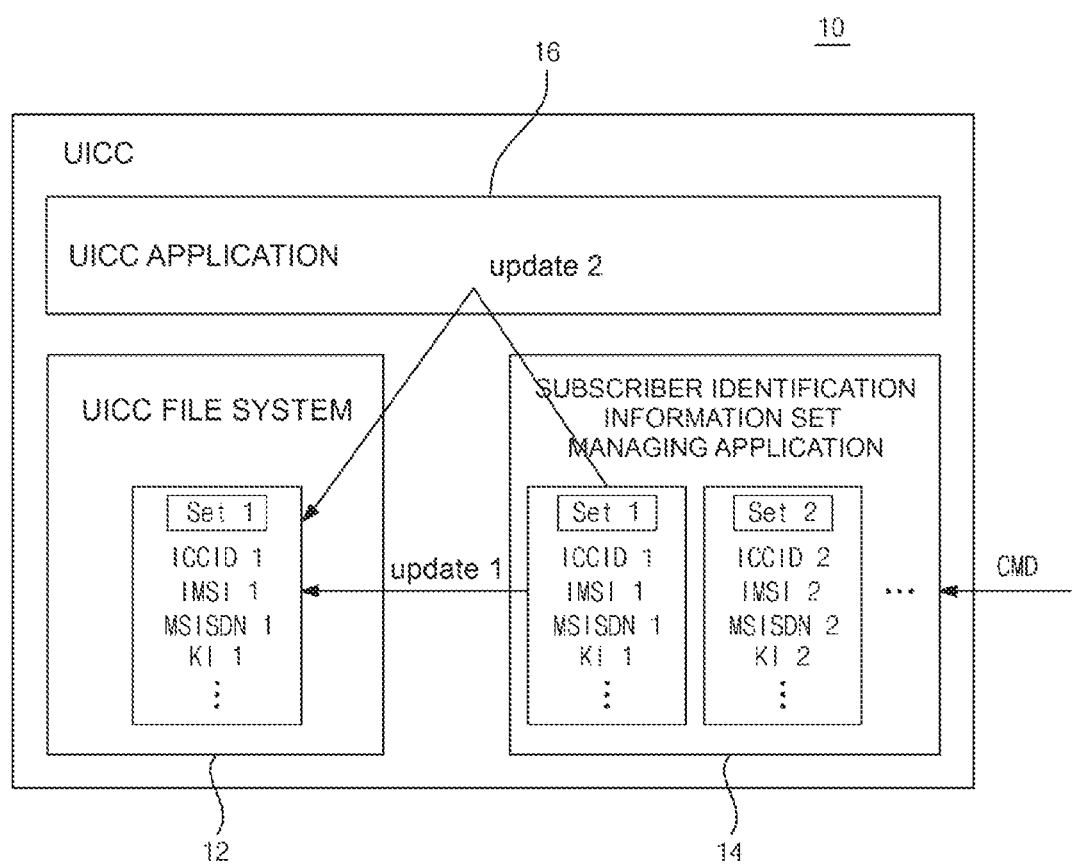

[Fig. 3]
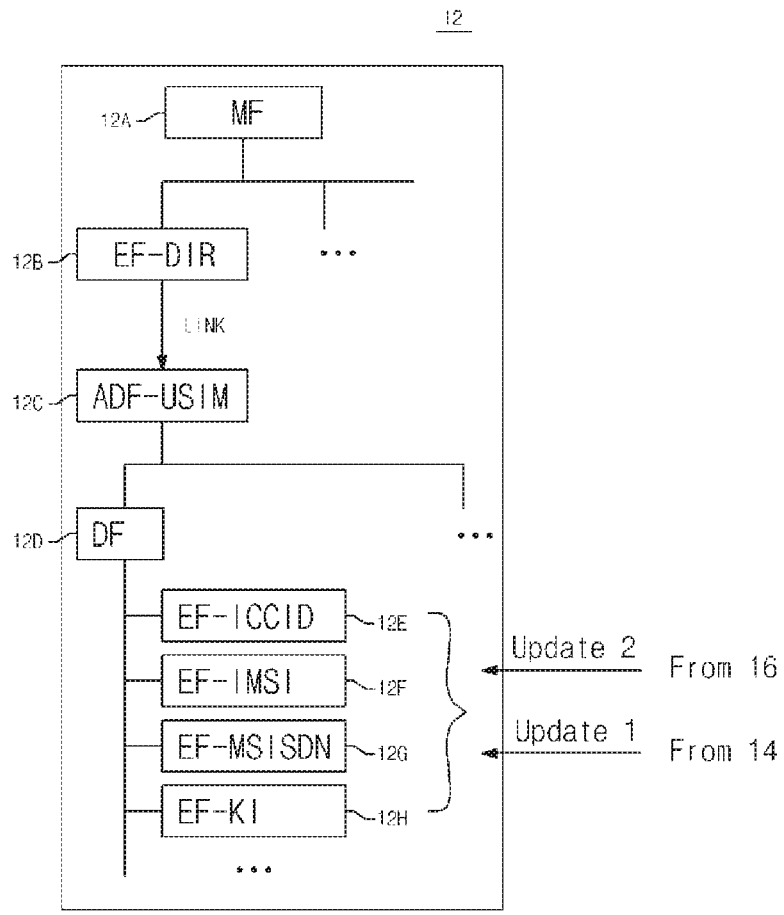
[Fig. 4]
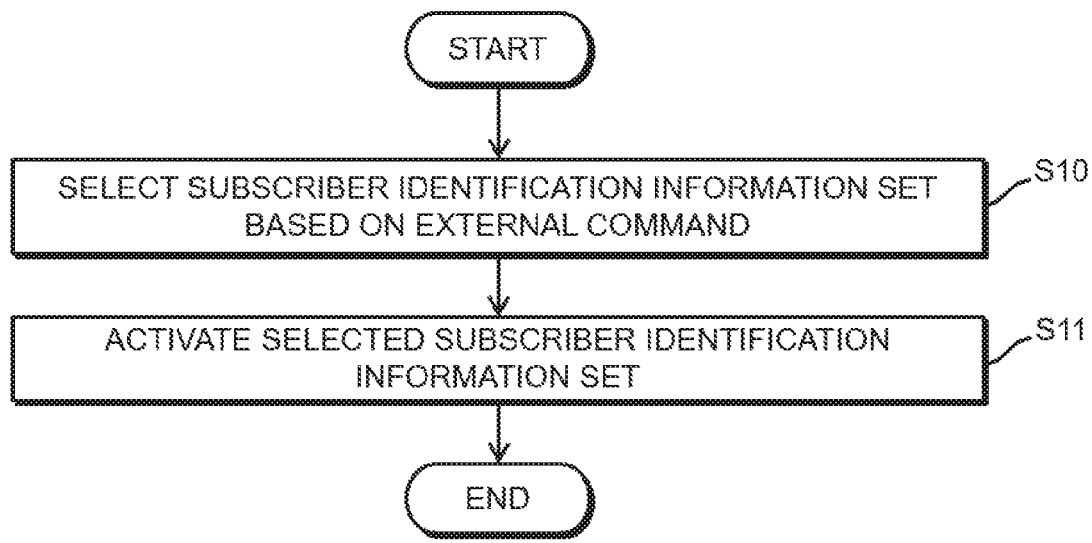

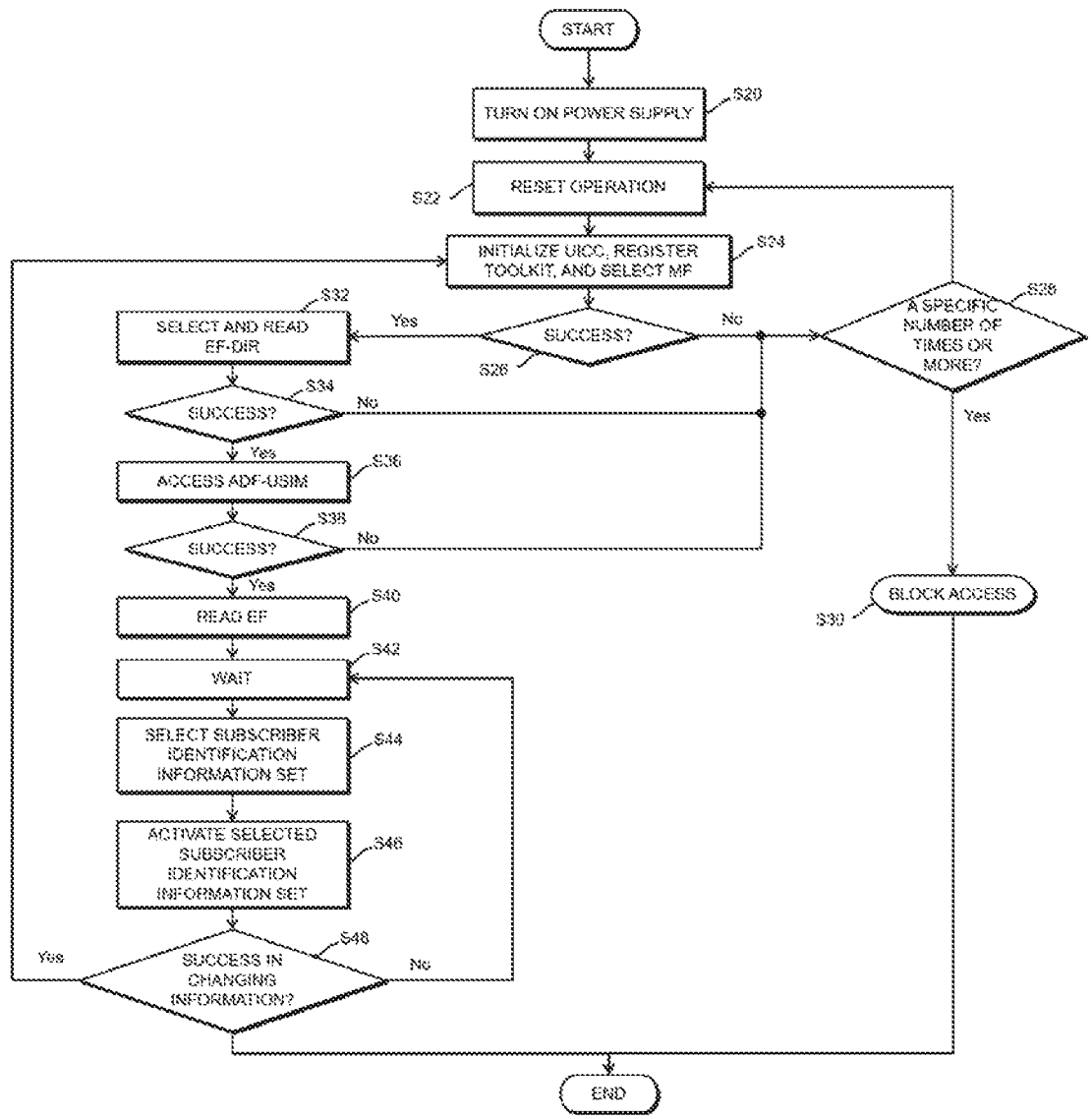

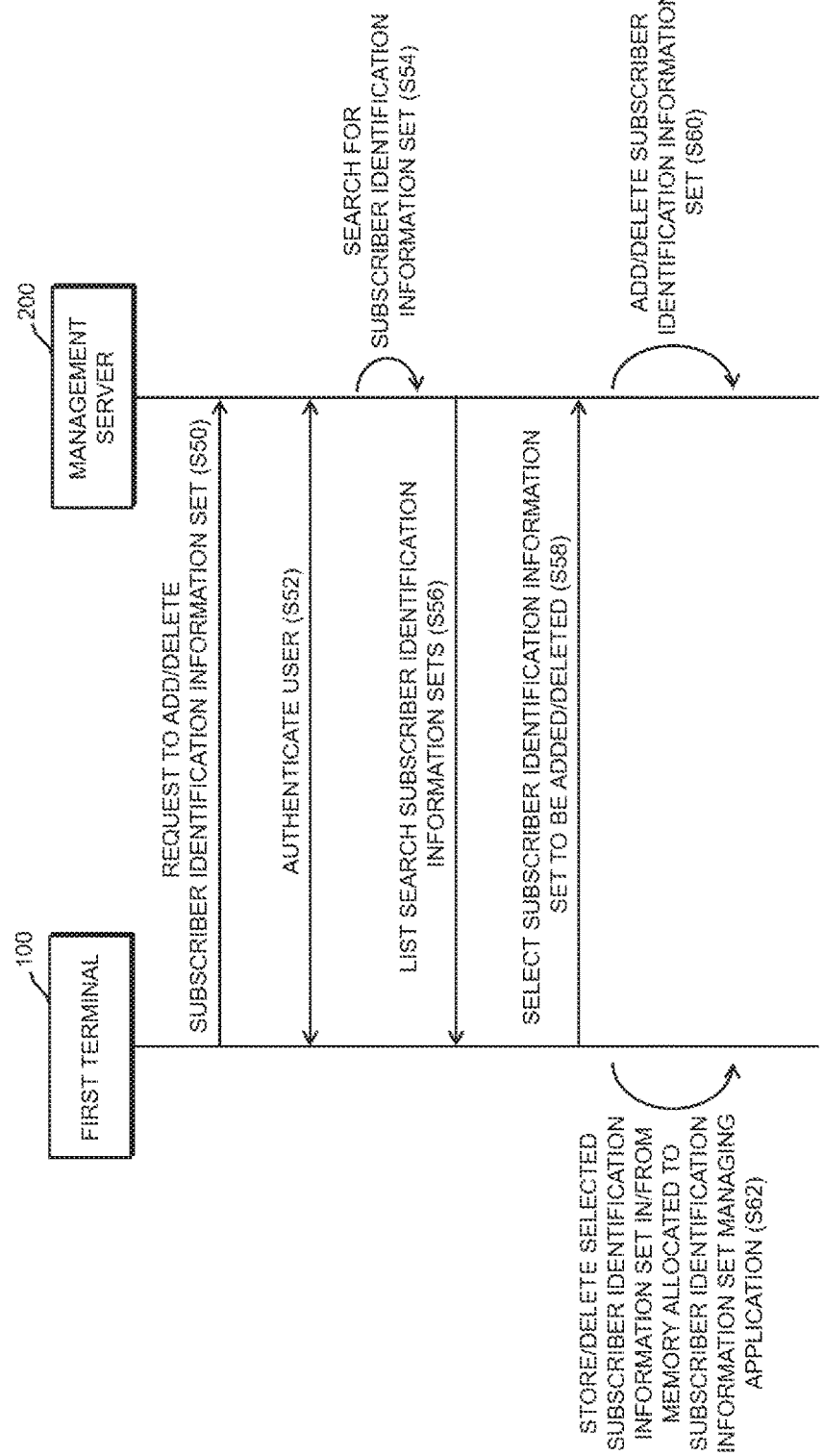

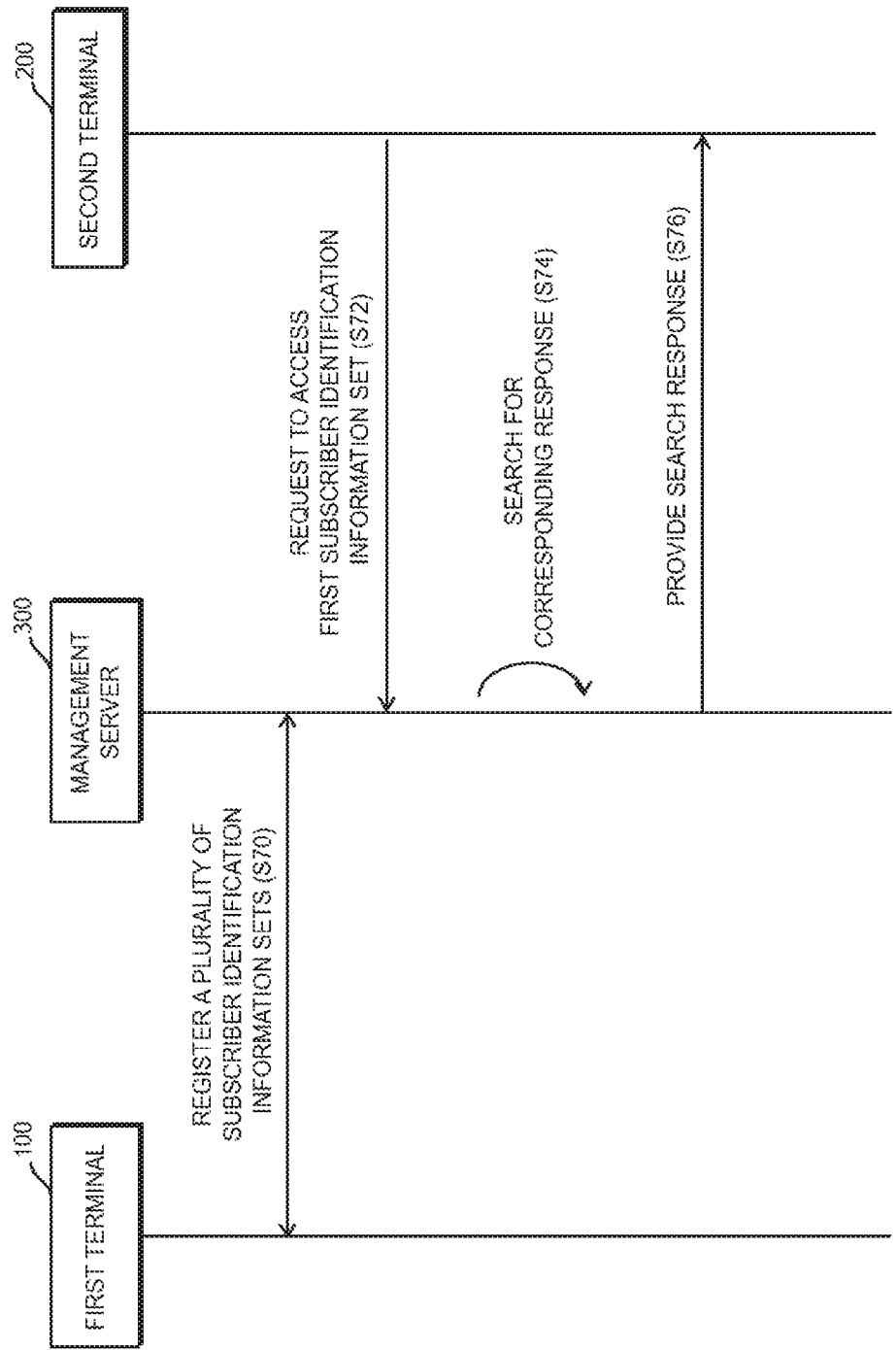

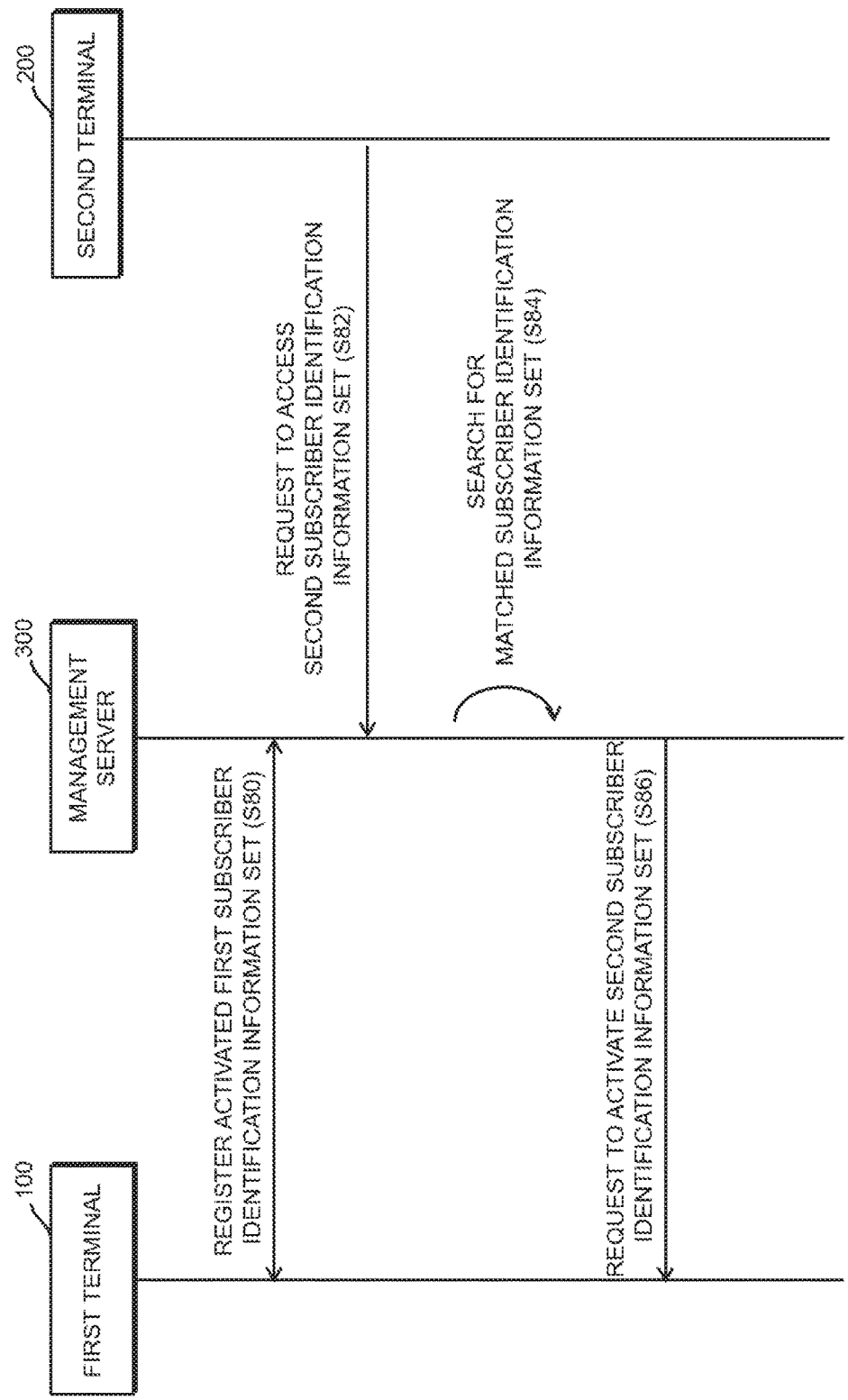
[Fig. 8]

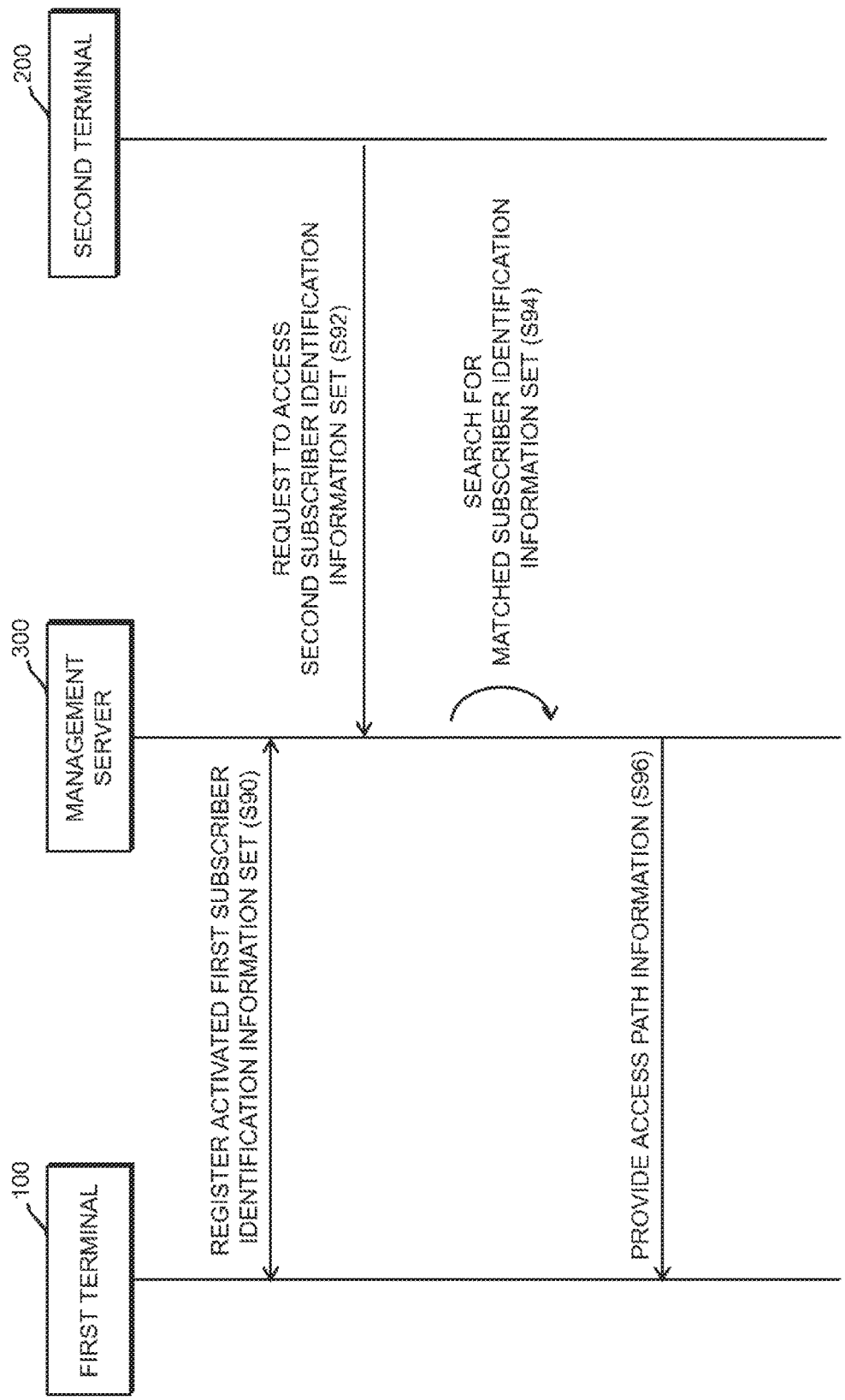

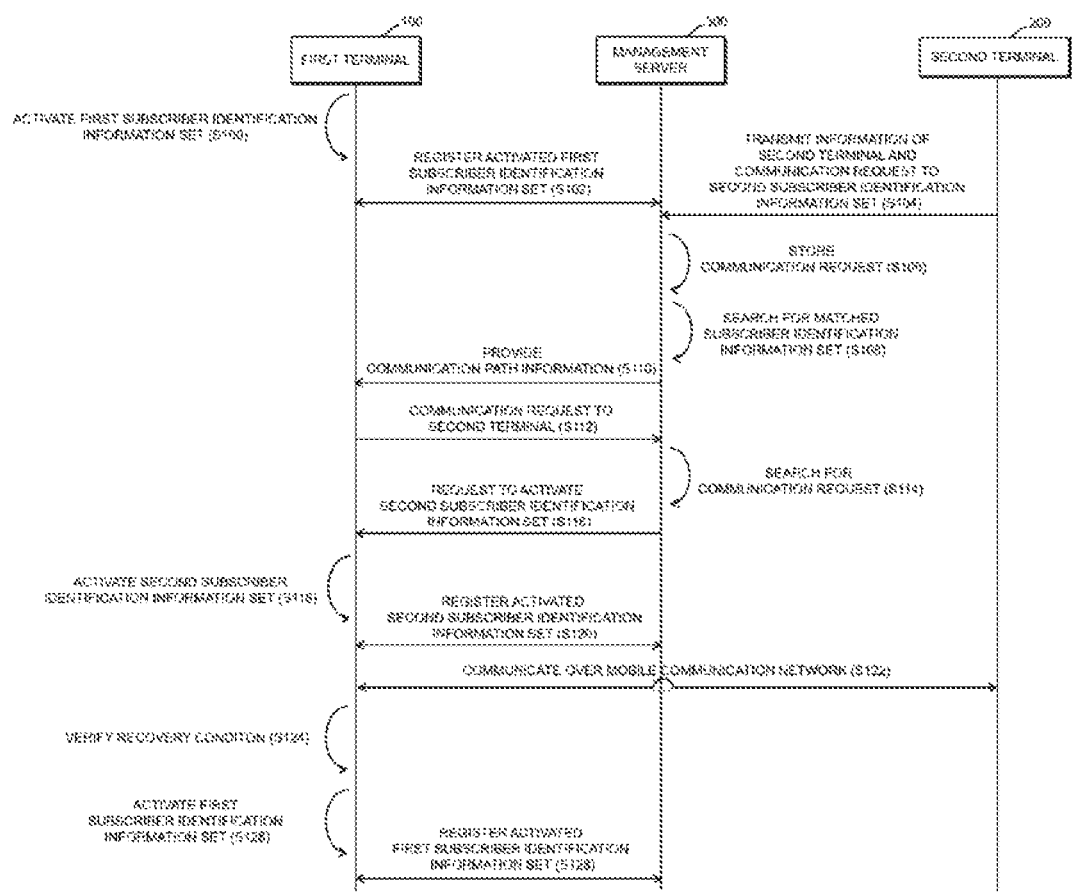
[Fig. 10]

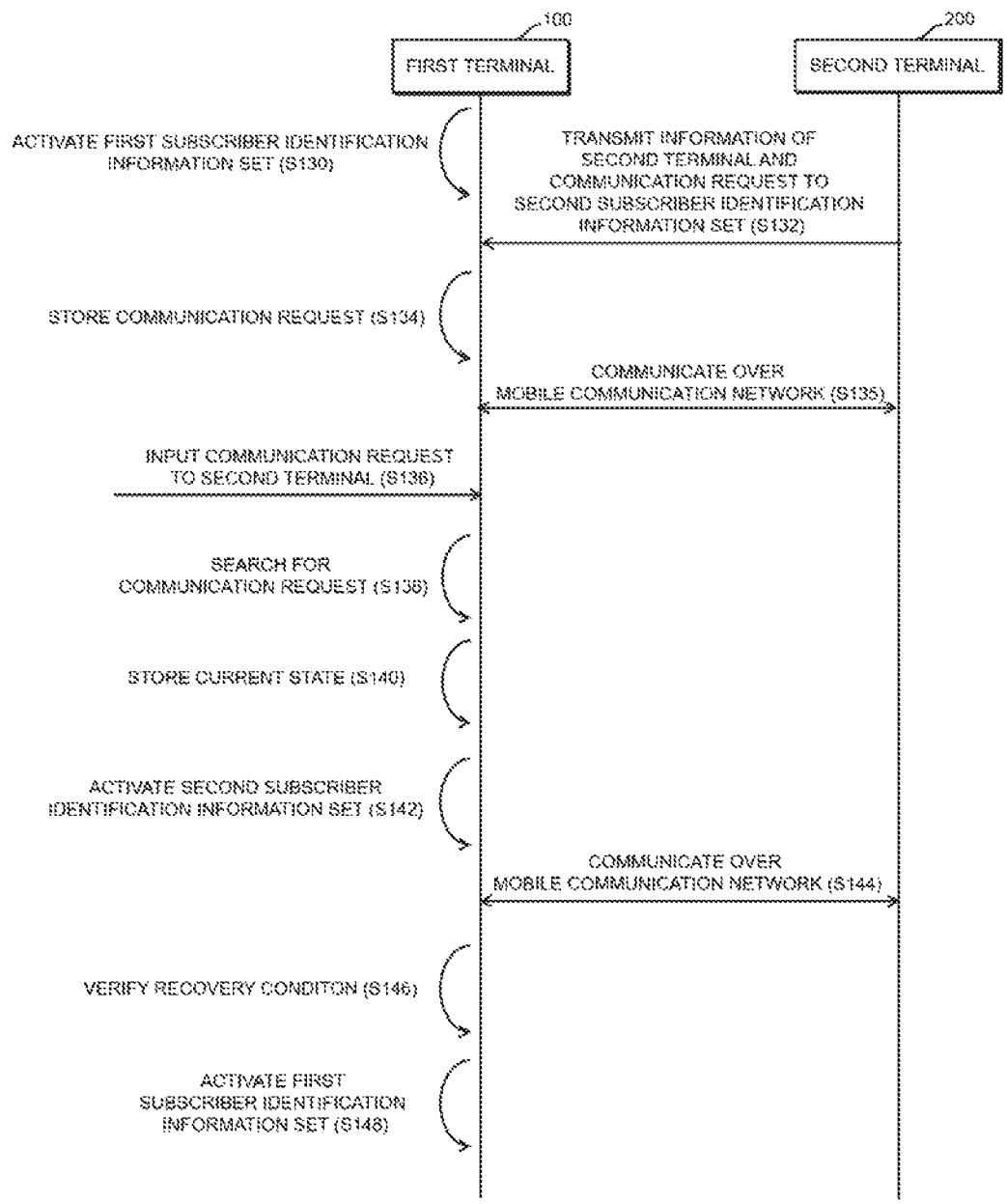
[Fig. 11]

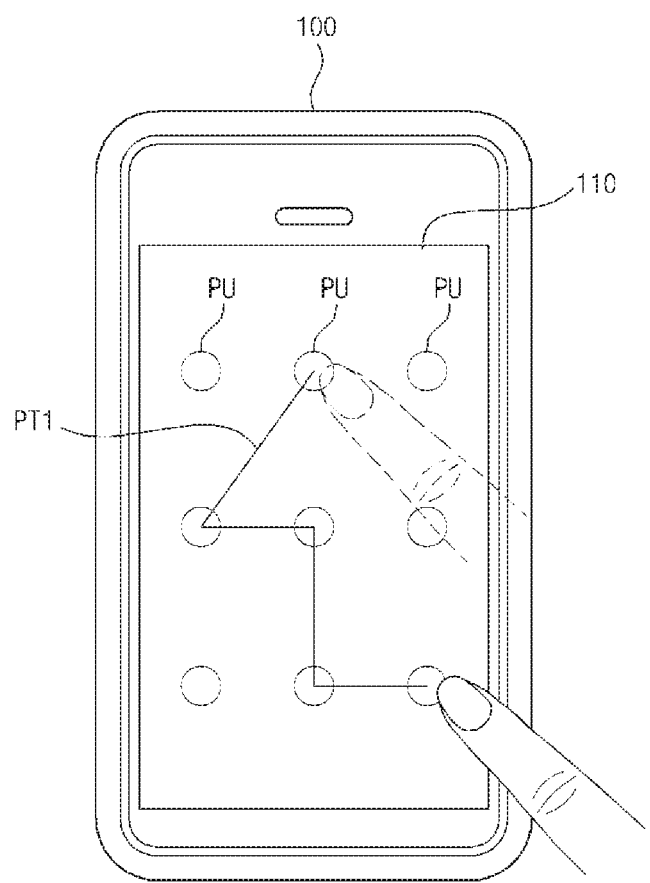

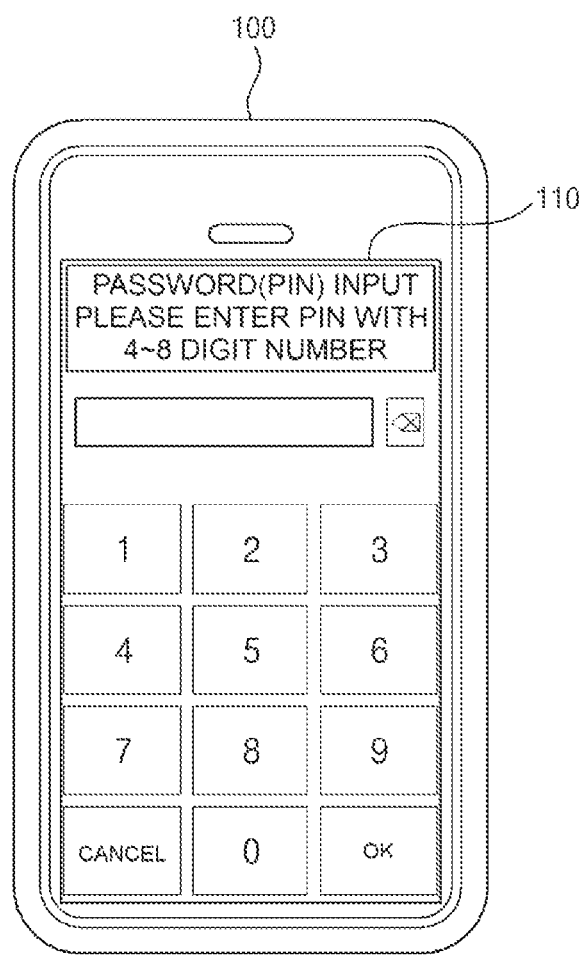
[Fig. 13]

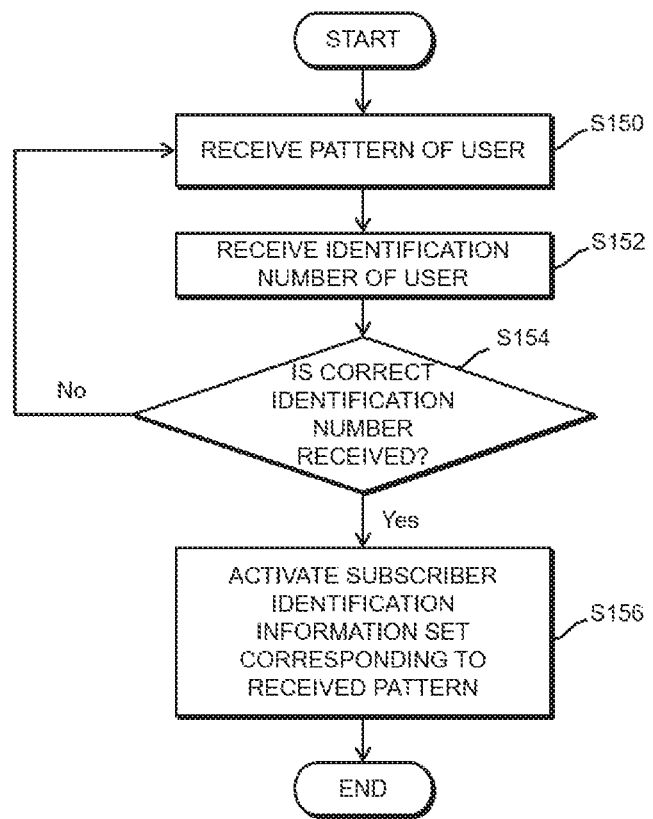

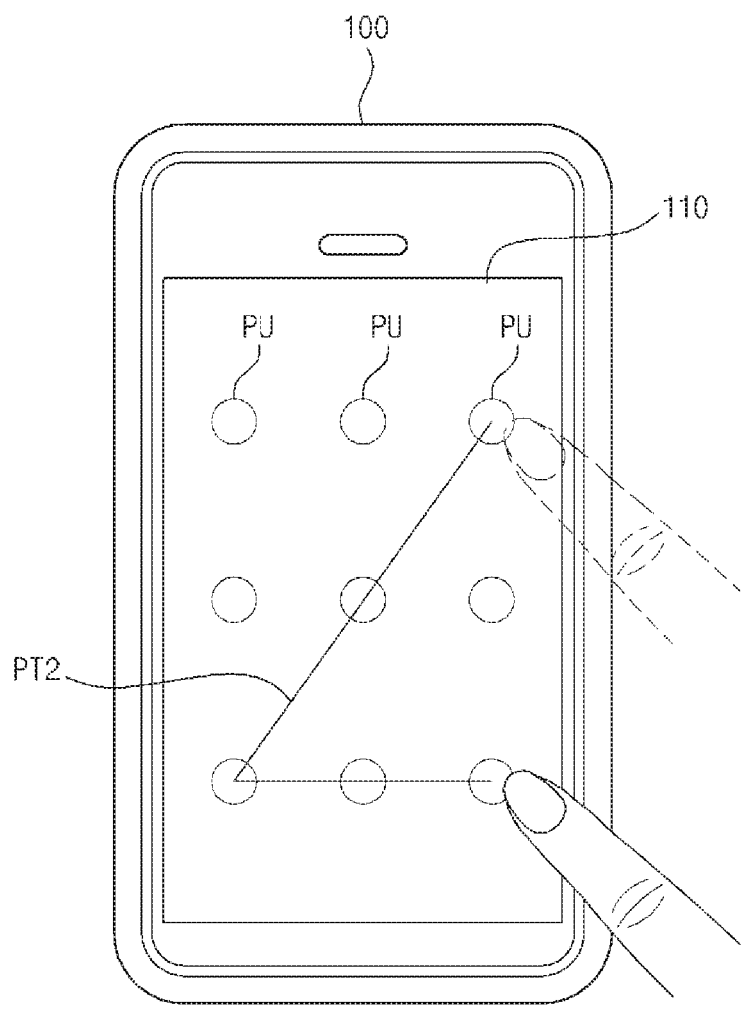

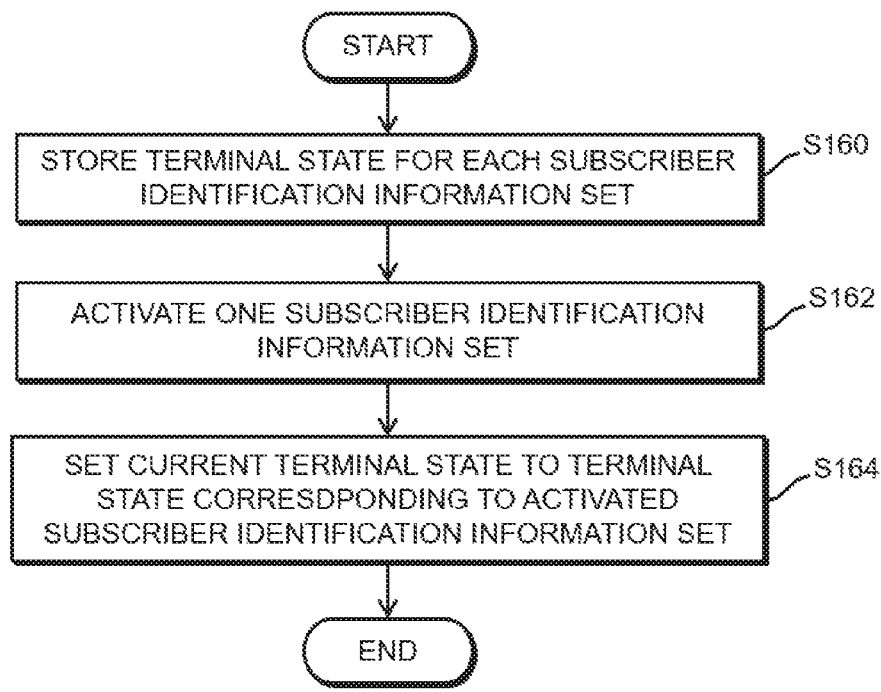
[Fig. 16]

METHOD FOR PROVIDING MULTI-NUMBER SERVICE

CROSS-REFERENCE TO RELATED APPLICATIONS

This application is the U.S. national stage application of International Patent Application No. PCT/KR2015/001711, filed Feb. 23, 2015, which claims priority to Korean Application Nos. 10-2014-0163571, filed Nov. 21, 2014; 10-2014-0176104, filed Dec. 9, 2014; 10-2014-0177563, filed Dec. 10, 2014; and 10-2014-0178192, filed Dec. 11, 2014, the disclosures of each of which are incorporated herein by reference in their entirety.

TECHNICAL FIELD

Embodiments of the present inventions described herein relate to a method for providing a multi-number service, and more particularly, relate to a method for providing a multi-number service to manage a plurality of subscriber identification information sets using one user terminal by storing the plurality of subscriber identification information sets in a one smart card, for example, a universal integrated circuit card (UICC).

BACKGROUND ART

Referred to as "universal integrated circuit (IC) card", a UICC is an important component of a universal mobile communication system and is implemented in the form of expanding a subscriber identity module (SIM) card.

The UICC may be inserted into a terminal to be used as a module for user authentication. The UICC may store personal information of a user and information regarding a mobile network operator (MNO) to which the user subscribes.

However, there is a limit in storing only one integrated circuit card identifier (ICCID), one international mobile subscriber identity (IMSI), and one mobile station international ISDN number (MSISDN) in one UICC according to standards.

DISCLOSURE

Technical Problem

Some exemplary embodiments of the present invention provide a multi-number service for managing a plurality of subscriber identification information sets using one user terminal by storing the plurality of subscriber identification information sets in a one smart card, for example, a universal integrated circuit card (UICC).

Technical Solution

According to an aspect of an exemplary embodiment, a method for providing a multi-number service using a smart card may include selecting one of a plurality of subscriber identification information sets, stored in a memory allocated to a subscriber identification information set managing application, based on a command received from the outside of the smart card and activating the selected subscriber identification information set.

According to an exemplary embodiment, the smart card may be a universal integrated circuit card (UICC).

According to an exemplary embodiment, the activating of the selected subscriber identification information set may include activating the subscriber identification information set by updating the selected subscriber identification information set to a file system in the smart card.

According to an exemplary embodiment, the activating of the selected subscriber identification information set may include activating the subscriber identification information set by updating the selected subscriber identification information set to the file system in the smart card through a universal subscriber identity module (USIM) application.

According to an exemplary embodiment, the plurality of subscriber identification information sets may include an integrated circuit card identifier (ICCID), an international mobile subscriber identity (IMSI), and a mobile station international ISDN number (MSISDN).

According to another aspect of an exemplary embodiment, a method for providing a multi-number service may include receiving, by a terminal, a list of at least one subscriber identification information set search and transmitted by a management server based on an add request of subscriber identification information set and storing, by the terminal, a subscriber identification information set selected based on the list of the at least one subscriber identification information set in a memory allocated to a subscriber identification information set managing application of a smart card.

According to another aspect of an exemplary embodiment, a method for providing a multi-number service may include receiving, by a terminal, a list of at least one subscriber identification information set search and transmitted by a management server based on a delete request of subscriber identification information set and deleting, by the terminal, a subscriber identification information set selected based on the list of the at least one subscriber identification information set from a memory allocated to a subscriber identification information set managing application of a smart card.

According to another aspect of an exemplary embodiment, a method for providing a multi-number service may include registering, by a management server, a plurality of subscriber identification information sets stored in a memory allocated to a subscriber identification information set managing application of a smart card of a first terminal, searching for, by the management server, a response corresponding to a subscriber identification information set requested to be accessed by a second terminal among the plurality of registered subscriber identification information sets, and transmitting, by the management server, the search response to the second terminal.

According to an exemplary embodiment, the response may be a message or a ring-back tone.

According to another aspect of an exemplary embodiment, a method for providing a multi-number service may include registering, by a management server, a first subscriber identification information set activated among a plurality of subscriber identification information sets stored in a memory allocated to a subscriber identification information set managing application of a smart card of a first terminal, receiving, by the management server, a request to access a second subscriber identification information set from a second terminal, and transmitting, by the management server, a request to activate the second subscriber identification information set to the first terminal.

According to another aspect of an exemplary embodiment, a method for providing a multi-number service may include registering, by a management server, a first subscriber identification information set activated among a plurality of subscriber identification information sets stored in a memory allocated to a subscriber identification information set managing application of a smart card of a first terminal, receiving, by the management server, a request to access a second subscriber identification information set from a second terminal, and transmitting, by the management server, access path information of providing notification that there is a request to access the second subscriber identification information set to the first terminal.

According to another aspect of an exemplary embodiment, a method for providing a multi-number service may include activating a first subscriber identification information set among a plurality of subscriber identification information sets of a first terminal, receiving a communication request to a second subscriber identification information set inactivated among the plurality of subscriber identification information sets and terminal information of a second terminal from the second terminal, mapping and storing the terminal information of the second terminal with the communication request, and activating the second subscriber identification information set based on the mapped and stored information and a communication request input to the second terminal.

According to an exemplary embodiment, the plurality of subscriber identification information sets may be stored in a memory allocated to a subscriber identification information set managing application of a smart card included in the first terminal.

According to an exemplary embodiment, the communication request input to the second terminal may be a voice call request or a message transmission request.

According to an exemplary embodiment, the method may further include verifying a recovery condition of the first subscriber identification information set after activating the second subscriber identification information set and activating the first subscriber identification information set if corresponding to the recovery condition.

According to an exemplary embodiment, the recovery condition may be determined based on whether a reference time elapses after a voice call connection is terminated.

According to an exemplary embodiment, the recovery condition may be determined based on whether message transmission is completed.

According to another aspect of an exemplary embodiment, a method for providing a multi-number service may include registering, by a management server, a first subscriber identification information set activated among a plurality of subscriber identification information sets stored in a memory allocated to a subscriber identification information set managing application of a smart card of a first terminal, receiving, by the management server, a communication request to a second subscriber identification information set inactivated among the plurality of subscriber identification information sets and terminal information of a second terminal from the second terminal, mapping and storing, by the management server, the terminal information of the second terminal with the communication request, and transmitting, by the management server, a request to activate the second subscriber identification information set to the first terminal based on the mapped and stored information and a communication request to the second terminal at the first terminal.

According to an exemplary embodiment, the plurality of subscriber identification information sets may be stored in the memory allocated to the subscriber identification information set managing application of the smart card included in the first terminal.

According to another aspect of an exemplary embodiment, a method for providing a multi-number service may include receiving, by a terminal, an activation pattern through a user interface (UI), selecting, by the terminal, one of a plurality of subscriber identification information sets based on the received activation pattern, and activating, by the terminal, the selected subscriber identification information set.

According to an exemplary embodiment, the plurality of subscriber identification information sets may be stored in a memory allocated to a subscriber identification information set managing application of the terminal.

According to an exemplary embodiment, the method may further include receiving, by the terminal, an identification number of a user.

According to an exemplary embodiment, the method may further include determining, by the terminal, whether the received identification number is an identification number corresponding to the received activation pattern. The activating of the subscriber identification information set may include activating, by the terminal, the selected subscriber identification information set based on the determined result.

According to an exemplary embodiment, the identification number may be a personal identification number (PIN).

According to an exemplary embodiment, the activation pattern may be a voice pattern.

According to an exemplary embodiment, the activation pattern may be a fingerprint pattern.

According to another aspect of an exemplary embodiment, a method for providing a multi-number service may include storing a terminal state corresponding to each of a plurality of subscriber identification information sets, activating one of the plurality of subscriber identification information sets, and setting a current terminal state to terminal state corresponding to the activated subscriber identification information set.

According to an exemplary embodiment, the plurality of subscriber identification information sets may be stored in a memory allocated to a subscriber identification information set managing application of a terminal.

According to an exemplary embodiment, the terminal state may be a communication establishment state of the terminal.

According to an exemplary embodiment, the communication establishment state may include at least one of whether a data network is connected, whether wireless-fidelity (Wi-Fi) is connected, whether a global positioning system (GPS) is connected, whether near field communication (NFC) is connected, and whether Bluetooth is connected.

According to an exemplary embodiment, the terminal state may be a notification mode setting state of the terminal.

According to an exemplary embodiment, the notification mode setting state may be an alarm mode, a ring mode, a vibrate mode, or a silent mode.

According to an exemplary embodiment, the terminal state may be an initial screen setting state of the terminal.

According to an exemplary embodiment, the initial screen setting state may include at least one of a list and arrangement of at least one application icon displayed on an initial screen of the terminal, a background image of the initial screen, and whether a lock of the initial screen is set.

Advantageous Effects

A method according to an exemplary embodiment may use a plurality of phone numbers using one user terminal by storing a plurality of subscriber identification information sets in one smart card, for example, a universal integrated circuit card (UICC).

Particularly, each of the plurality of subscriber identification information sets may include an integrated circuit card ID (ICCID), an international mobile subscriber identity (IMSI), a mobile station international ISDN number (MSISDN), and key information used for network access. In this case, in contrast to simply managing several phone numbers, one physical smart card may manage a name (e.g., an IMSI) of a user and key information for each of a plurality of smart card identification information (e.g., ICCIDs). In other words, various services, such as a service a corporate user uses a terminal using a personal name and a service where a postpaid user uses a terminal using a name of a prepaid user, may be implemented other than a service for providing several phone numbers according to an exemplary embodiment.

Further, according to a method of an exemplary embodiment, the user may manage a phone number he or she wants to use by adding or deleting the plurality of subscriber identification information sets stored in the one UICC.

Further, according to a method of an exemplary embodiment, a user terminal and a management server may provide a service specialized for each of the plurality of subscriber identification information sets.

Further, according to a method of an exemplary embodiment, the user terminal may conveniently manage subscriber identification information sets in a reply operation by activating a corresponding subscriber identification information set among the plurality of subscriber identification information sets and replying to another terminal based on a communication path requested from the other terminal.

Further, according to a method of an exemplary embodiment, the user terminal may enhance user convenience by recovering a subscriber identification information set if a reply to another terminal is completed.

Further, according to a method of an exemplary embodiment, the user terminal may conveniently select and activate a subscriber identification information set by activating a corresponding subscriber identification information set among the plurality of subscriber identification information sets based on an input activation pattern.

Further, according to a method of an exemplary embodiment, the user terminal may enhance security for each of subscriber identification information sets by requesting different identification numbers based on an input activation pattern.

Further, according to a method of an exemplary embodiment, the user terminal may conveniently set and manage a terminal state for each subscriber identification information set by setting a current terminal state to a terminal state corresponding to an activated subscriber identification information set.

Particularly, the user terminal may perform a detailed setting associated with a notification mode setting state and an initial screen setting state as well as a communication establishment state of the user terminal in a suitable form for each subscriber identification information set.

DESCRIPTION OF DRAWINGS

A detailed description will be given of each drawing to more fully understand drawings cited in the detailed description of the inventive concept.

FIG. 1 is a drawing illustrating the concept of a universal integrated circuit card (UICC) included in a terminal according to an exemplary embodiment of the inventive concept;

FIG. 2 is a block diagram illustrating a process of managing a subscriber identification information set in a UICC of FIG. 1;

FIG. 3 is a drawing illustrating a file structure of a UICC file system of FIG. 2;

FIG. 4 is a flowchart illustrating a method for providing a multi-number service according an exemplary embodiment;

FIG. 5 is a flowchart illustrating a method for providing a multi-number service according another embodiment;

FIG. 6 is a sequence diagram illustrating a data flow of a method for providing a multi-number service according another embodiment;

FIG. 7 is a sequence diagram illustrating a data flow of a method for providing a multi-number service according another embodiment;

FIG. 8 is a sequence diagram illustrating a data flow of a method for providing a multi-number service according another embodiment;

FIG. 9 is a sequence diagram illustrating a data flow of a method for providing a multi-number service according another embodiment;

FIG. 10 is a sequence diagram illustrating a data flow of a method for providing a multi-number service according another embodiment;

FIG. 11 is a sequence diagram illustrating a data flow of a method for providing a multi-number service according another embodiment;

FIG. 12 is a drawing illustrating an example of an activation pattern input via a user interface of a terminal shown in FIG. 1;

FIG. 13 is a drawing illustrating a user interface (UI) according to an exemplary embodiment for receiving an identification number of a user after an activation pattern of FIG. 12 is input;

FIG. 14 is a flowchart illustrating a method for providing a multi-number service according another embodiment;

FIG. 15 is a drawing illustrating another example of an activation pattern input via a UI of a terminal shown in FIG. 1; and FIG. 16 is a flowchart illustrating a method for providing a multi-number service according another embodiment.

BEST MODE

The specific structural or functional description disclosed herein is merely illustrative for the purpose of describing embodiments according to the inventive concept. The embodiments according to the inventive concept can be implemented in various forms, and may not be construed as limited to the embodiments set forth herein.

The embodiments according to the inventive concept may be variously modified and have various shapes. Thus, the embodiments are illustrated in the drawings and are intended to be described herein in detail. However, the embodiments according to the inventive concept are not construed as limited to specified disclosures, and include all changes, equivalents, or substitutes that do not depart from the spirit and technical scope of the present invention.

Terms such as "first" and "second" may be used in describing various elements, but the above elements should not be restricted to the above terms. The above terms are used only to distinguish one element from the other. For instance, the first element may be named the second element, and vice versa, without departing the scope of claims of the inventive concept.

When one element is described as being "connected" or "accessed" to another element, it should be construed as being connected or accessed to the other element directly but also as possibly having another element in between. On the other hand, if one element is described as being "directly connected" or "directly accessed" to another element, it should be construed that there is no other element in between. Other expressions describing relations between the elements, for example, "between" and "directly between" or "adjacent" and "directly adjacent," should be interpreted in the same fashion.

The terms used in the specification are intended to describe certain embodiments only, and should by no means restrict the inventive concept. Unless clearly used otherwise, expressions in a singular form include a meaning of a plural form. In the specification, an expression such as "comprising" or "including" is intended to designate a characteristic, a number, a step, an operation, an element, a part or combinations thereof, and should not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary should be construed to have the same meaning in the context of the relevant art, and, unless otherwise defined explicitly, should not be interpreted to have an idealistic or excessively formalistic meaning.

FIG. 1 is a drawing illustrating the concept of a universal integrated circuit card (UICC) included in a terminal according to an exemplary embodiment.

According to an exemplary embodiment, a first terminal 100 may be implemented as a cellular phone, a smartphone, a tablet personal computer (PC), or the like. It should not be interpreted as limiting a technical scope of the inventive concept by the form of the terminal 100.

Referring to FIG. 1, a smart card, for example, a UICC 10 may be loaded into the first terminal 100. For example, the UICC 10 may be loaded into the first terminal 100 in the form of a chip or card.

In the specification, the smart card may refer to the concept including a secure element (SE), such as a subscriber identity module (SIM), a universal subscriber identity module (USIM), and a UICC, which may manage a subscriber identification information set.

The UICC 10 may store personal information of a user and operator information regarding a mobile network operator (MNO) to which he or she subscribes. For example, the UICC 10 may store and manage a plurality of subscriber identification information sets.

Each of the plurality of subscriber identification information sets may widely mean a data set including data for identifying a subscriber, a UICC (or USIM), or an MNO. Each of the plurality of subscriber identification information sets may correspond to one phone number. According to an exemplary embodiment, each of the plurality of subscriber identification information sets may include an integrated circuit card identifier (ICCID), an international mobile subscriber identity (IMSI), a mobile station international ISDN number (MSISDN), key information for network access, and the like.

FIG. 2 is a block diagram illustrating a process of managing a subscriber identification information set in a UICC of FIG. 1. FIG. 3 is a drawing illustrating a file structure of a UICC file system of FIG. 2. FIG. 4 is a flowchart illustrating a method for providing a multi-number service according an exemplary embodiment.

Referring to FIGS. 1 and 2, there may be a UICC file system 12 in the UICC 10. A subscriber identification information set managing application 14 and a USIM application 16 may be installed in the UICC 10.

In the specification, an application may be used as the meaning of including application software and may refer to the concept of including an applet.

The subscriber identification information set managing application 14 may register a subscriber identification set (e.g., a first subscriber identification information set set1) to be used when the first terminal 100 accesses a network in the UICC file system 12.

Referring to FIGS. 2 and 3, a file structure of the UICC file system 12 may be configured with several files in a lower level of a master file (MF) 12A. An EF-DIR 12B which is a linear fixed type of an element file (EF) as a mandatory file included in the several files may be present as a lower level file of the MF 12A.

The ADF-USIM 12C may be the highest node of EFs (e.g., an EF-ICCID 12E, an EF-IMSI 12F, an EF-MSISDN 12G, an EF-KI 12H, and the like) used by the USIM application 16. Link information about the ADF-USIM 12C may be included in the EF-DIR 12B.

Several files may exist in a lower level of the ADF-USIM 12C. EFs, that is, the EF-ICCID 12E, the EF-IMSI 12F, the EF-MSISDN 12G, the EF-KI 12H, and the like, necessary for actually accessing a mobile communication network may be configured in a lower level of a dedicated file 12D as a mandatory file included in the several files. Upon actually accessing the mobile communication network, the EF-ICCID 12E, the EF-IMSI 12F, the EF-MSISDN 12G and the EF-KI 12H may be read to the outside of the UICC 10 by the USIM application 16.

In the UICC 10 according to an exemplary embodiment, the EFs, that is, the EF-ICCID 12E, the EF-IMSI 12F, the EF-MSISDN 12G, and the EF-KI 12H, necessary for actually accessing the mobile communication network may be updated through the subscriber identification information set managing application 14 or the USIM application 16 (see reference denotation "update 1" or "update 2").

For example, an ICCID1 included in the first subscriber identification information set set1 may be stored in an EF (e.g., the EF-ICCID 12E) for storing an ICCID of the UICC file system 12. An IMSI1 included in the first subscriber identification information set set1 may be stored in an EF (e.g., the EF-IMSI 12F) for storing an IMSI of the UICC file system 12. An MSISDN1 included in the first subscriber identification information set set1 may be stored in an EF (e.g., the EF-MSISDN 12G) for storing an MSISDN of the UICC file system 12. KI1 for network access may be stored in an EF (e.g., the EF-KI 12H) for storing a key.

When the first terminal 100 performs network authentication, a subscriber identification information set stored in the UICC file system 12 may be transmitted to the outside through the USIM application 16.

The subscriber identification information set managing application 14 may store and manage the plurality of subscriber identification information sets set1, set2, and the like stored in the UICC 10.

The plurality of subscriber identification information sets set1, set2, and the like may be respectively stored in a memory allocated to the subscriber identification information set managing application 14.

Each of the plurality of subscriber identification information sets set1, set2, and the like may include an ICCID, an IMSI, an MSISDN, KI, and the like. For example, the first subscriber identification information set set1 may include the ICCID1, the IMSI1, the MSISDN1, and the KI1, and the second subscriber identification information set set2 may include the ICCID2, the IMSI2, the MSISDN2, and the KI2.

Referring to FIGS. 2 and 4, in operation S10, the subscriber identification information set managing application 14 may select one of the plurality of subscriber identification information sets set1, set2, and the like based on an external command CMD received from the outside of the UICC 10. In operation S11, the subscriber identification information set managing application 14 may activate the selected subscriber identification information set.

The external command CMD may be generated by an application executed in the outside of the UICC 10. Embodiments of the present invention are not limited thereto.

For example, the subscriber identification information set managing application 14 may activate the first subscriber identification information set set1 by selecting the first subscriber identification information set set1 among the plurality of subscriber identification information sets set1, set2, and the like and updating the selected first subscriber identification information set set1 to the UICC file system 12.

According to an exemplary embodiment, the subscriber identification information set managing application 14 may directly update the selected subscriber identification information set (e.g., the first subscriber identification information set set1) to the UICC file system 12 via an application program interface (API) (not shown) (see reference denotation "update 1").

According to another embodiment, the subscriber identification information set managing application 14 may update the subscriber identification information set (e.g., the first subscriber identification information set set1) to the UICC file system 12 via the API (not shown) and the USIM application 16 (see reference denotation "update 2").

The USIM application 16 may be driven to perform various functions necessary for network access and subscriber authentication of the first terminal 100.

Upon network access and subscriber authentication, the USIM application 16 may transmit a subscriber identification information set stored in the UICC file system 12 to the outside of the UICC 10.

According to an exemplary embodiment, the USIM application 16 may relay an update operation (see reference denotation "update 2") performed between the subscriber identification information set managing application 14 and the UICC file system 12.

According to an exemplary embodiment, the first terminal 100 may manage an address book, incoming and outgoing text records, or incoming and outgoing call records for each subscriber identification information set. The first terminal 100 may activate an address book, incoming and outgoing text message records, or incoming and outgoing call records corresponding to an activated subscriber identification information set, based on the activated subscriber identification information set. Particularly, when a user makes a call to a telephone number included in an address book corresponding to a specific subscriber identification information set, the first terminal 100 may transmit a command CMD for activating a subscriber identification information set corresponding to the address book to the UICC 10.

According to another embodiment, the first terminal 100 may manage an application group displayed on a background screen for each subscriber identification information set. In this case, the first terminal 100 may display an application group corresponding to an activated subscriber identification information set, on the background screen based on the activated subscriber identification information set.

According to another embodiment, the first terminal 100 may provide an information protection service for each subscriber identification information set. For example, an address book, incoming and outgoing text message records, or incoming and outgoing call records corresponding to at least one subscriber identification information set requested for information protection among the plurality of subscriber identification information sets may be stored in the UICC 10 or the first terminal 100 or in a server independent of the first terminal 100. In this case, the address book, the incoming and outgoing text records, or the incoming and outgoing call records may be encrypted and stored. For example, the encryption may be performed using an encryption key in the UICC 10.

According to another embodiment, the first terminal 100 may manage content (e.g., a photo file, a voice file, a video file, and the like) for each subscriber identification information set. In this case, the first terminal 100 may be configured to verify only content corresponding to an activated subscriber identification information set, based on the activated subscriber identification information set.

According to another embodiment, the first terminal 100 may provide a secret phone service for each subscriber identification information set. In this case, when a specific subscriber identification information set receives text message or call, the first terminal 100 may fail to display the received text message or call and may store and manage information about the received text message or call in the UICC 10. Also, the first terminal 100 may transmit a text message or a voice message for providing notification of a situation where it is difficult to be in contact with a caller of the text message or call currently.

According to another embodiment, the first terminal 100 may set an authority for use an application for each subscriber identification information set. In this case, when specific subscriber identification information is activated, the first terminal 100 may refrain from using a specific application (e.g., a game application and the like). Also, the authority for use an application for each subscriber identification information set of the first terminal 100 may be set by an external terminal (e.g., a terminal of a security manager of a company).

According to another embodiment, the first terminal 100 may manage an accredited certificate for each subscriber identification information set. In this case, the first terminal 100 may be configured to use an accredited certificate, corresponding to an activated subscriber identification information set, as a default accredited certificate based on the activated subscriber identification information set.

In FIGS. 1 and 2, the UICC 10 is illustrated as an example of an IC card (or a chip card or a smart card) which stores and manages subscriber identification information sets of the first terminal 100. However, the UICC 10 may be replaced with a different name or type of card.

FIG. 5 is a flowchart illustrating a method for providing a multi-number service according another embodiment.

Referring to FIGS. 1 to 5, when the first terminal 100 is powered on in operation S20, in operation S22, the UICC 10 may perform a reset operation based on control of the first terminal 100.

In operation S24, the UICC 10 may be initialized and may register a toolkit for providing a multi-number service according to an exemplary embodiment of the present invention, based on a terminal profile of the first terminal 100. In operation S24, the UICC 10 may select the MF 12A for network access.

In operation S26, the UICC 10 may determine whether operation S24 is successfully performed. When operation S24 is not successfully performed, in operation S28, the UICC 10 may determine whether this situation is repeated a specific number of times or more.

When the situation is repeated the specific number of times or more, in operation S30, the UICC 10 may block access to the UICC file system 12.

When the situation is not repeated the specific number of times or more, the UICC 10 may perform the operation from operation S22.

When operation S24 is successfully performed, in operation S32, the UICC 10 may select and read the EF-DIR 12B.

In operation S34, the UICC 10 may determine whether operation S32 is successfully performed. When operation S32 is not successfully performed, the UICC 10 may perform the operation from operation S28. When operation S32 is successfully performed, in operation S36, the UICC 10 may access the ADF-USIM 12C based on link information of the EF-DIR 12B.

In operation S38, the UICC 10 may determine whether operation S36 is successively performed. When operation S36 is not successively performed ("No" in operation S38), the UICC 10 may perform the operation from operation S28. When operation S36 is successively performed ("Yes" in operation S38), in operation S40, the UICC 10 may read EFs (e.g., the EF-ICCID 12E, the EF-IMSI 12F, the EF-MSISDN 12G, the EF-KI 12H, and the like) constituting the DF 12D located in the lower level of the ADF-USIM 12C.

After operation S40, in operation S42, the UICC 10 may be switched to an idle state. Until operation S44 is performed, the first terminal 100 may access a network by the EFs (e.g., the EF-ICCID 12E the EF-IMSI 12F, the EF-MSISDN 12G, the EF-KI 12H, and the like) read in operation S40.

In operation S44, a subscriber identification information set may be selected by a process performed interior or exterior of the UICC 10. For example, one (e.g., a first subscriber identification information set set1) of a plurality of subscriber identification information sets (e.g., first and second subscriber identification information sets set1 and set2, and the like) may be selected by an external command CMD input to the subscriber identification information set managing application 14 of FIG. 2.

In this case, in operation S46, the selected subscriber identification information set (e.g., the first subscriber identification information set set1) may be activated. In other words, each of data (e.g., the ICCID1, the IMSI1, the MSISDN1, and the KI1) of the selected subscriber identification information set (e.g., the first subscriber identification information set set1) may be updated to each of the EFs (e.g., the EF-ICCID 12E, the EF-IMSI 12F, the EF-MSISDN 12G, and the EF-KI 12H) of the UICC file system 12 through various update paths (e.g., update 1 and update 2).

In operation S48, the UICC 10 may determine whether a change of a subscriber identification information set is successively performed. When the change of the subscriber identification information set is successively performed, the UICC 10 may perform the operation again from operation S24. When the change of the subscriber identification information set is not successively performed, the UICC 10 may be switched to the idle state in operation S42.

FIG. 6 is a sequence diagram illustrating a data flow of a method for providing a multi-number service according another embodiment.

A management server 200 may be a server which may manage a plurality of subscriber identification information sets stored in a first terminal 100 or register the plurality of subscriber identification information set through network authentication. According to an exemplary embodiment, the management server 200 may be, but is not limited to, an MNO server.

According to an exemplary embodiment, the management server 200 may map and store identification information of the first terminal 100 with a plurality of subscriber identification information sets corresponding to the identification information.

Referring to FIGS. 1 to 6, in operation S50, the first terminal 100 may transmit a request to add or delete a subscriber identification information set based on an input of its user to the management server 200.

In operation S52, the management server 200 may authenticate the user of the first terminal 100. According to an exemplary embodiment, the management server 200 may authenticate the user using a short message service (SMS). According to another embodiment, the management server 200 may authenticate the user through a personal identification number (PIN) of the user.

When the user succeeds in authenticating himself or herself, in operation S54, the management server 200 may search for a subscriber identification information set which may be added or a subscriber identification information set which may be deleted.

According to an exemplary embodiment, when receiving the request to add the subscriber identification information set from the first terminal 100, the management server 200 may newly generate a subscriber identification information set which may be added.

In operation S56, the management server 200 may generate a list of the search subscriber identification information sets and may transmit the generated list to the first terminal 100.

In operation S58, the user may select a subscriber identification information set to be added or deleted, from the list received via the first terminal 100. Information regarding the selected subscriber identification information set may be transmitted to the management server 200.

In operation S60, the management server 200 may add or delete the selected subscriber identification information set to or from the management server 200 or a database of the management server 200. In this case, the management server 200 may add or delete the selected subscriber identification information set to or from a list of subscriber identification information sets mapped with identification information of the first terminal 100.

In operation S62, the first terminal 100 may add or delete the selected subscriber identification information set to or from a memory allocated to the subscriber identification information set managing application 14.

FIG. 7 is a sequence diagram illustrating a data flow of a method for providing a multi-number service according another embodiment.

Referring to FIGS. 1 to 4 and 7, in operation S70, a first terminal 100 may register a plurality of subscriber identification information sets, stored in a memory allocated to a subscriber identification information set managing application 14, in a management server 300 in advance. In this case, a user may set to provide a different response for each subscriber identification information set registered in the management server 300, using the first terminal 100.

In operation S72, the management server 300 may receive a request to access a first subscriber identification information set from a second terminal 200.

In operation S74, the management server 300 may search for a response corresponding to the first subscriber identification information set requested to be accessed by the second terminal 200 among the plurality of registered subscriber identification information sets.

In operation S76, the management server 300 may transmit the search response to the second terminal 200.

According to an exemplary embodiment, the response in operation S76 may be a response message or a ring-back tone.

For example, when a request to access the first subscriber identification information set is received, the management server 300 may transmit a response message, such as "the number you dialed is a cancelled number", to the second terminal 200. When a request to access a second subscriber identification information set is received, the management server 300 may transmit a ring-back tone to the second terminal 200.

For example, in cases that the request to access the first subscriber identification information set is received, and the request to access the second subscriber identification information set is received, the management server 300 may transmit different response messages (or different ring-back tones) to the second terminal 200.

FIG. 8 is a sequence diagram illustrating a data flow of a method for providing a multi-number service according another embodiment.

Referring to FIGS. 1 to 4 and 8, in operation S80, a first terminal 100 may register a first subscriber identification information set activated among a plurality of subscriber identification information sets, stored in a memory allocated to a subscriber identification information set managing application 14, in a management server 300.

In operation S82, the management server 300 may receive a request to access a second subscriber identification information set from a second terminal 200.

In operation S84, the management server 300 may search for the first subscriber identification information set currently activated in the first terminal 100 which is matched with the second subscriber identification information set, that is, the first terminal 100 has the second subscriber identification information set. In other words, the management server 300 may search for subscriber identification information sets mapped with the second subscriber identification information set.

In operation S86, the management server 300 may transmit a request to activate the second subscriber identification information set to the first terminal 100 corresponding to the first subscriber identification information set.

In other words, in a case that the first terminal 100 activates the first subscriber identification information set, but the second terminal 200 requests to access the second subscriber identification information set, the management server 300 may allow the first terminal 100 to activate the second subscriber identification information set.

FIG. 9 is a sequence diagram illustrating a data flow of a method for providing a multi-number service according another embodiment.

Referring to FIGS. 1 to 4 and 9, in operation S90, a first terminal 100 may register a first subscriber identification information set activated among a plurality of subscriber identification information sets, stored in a memory allocated to a subscriber identification information set managing application 14, in a management server 300.

In operation S92, the management server 300 may receive a request to access a second subscriber identification information set from a second terminal 200.

In operation S94, the management server 300 may search for the first subscriber identification information set currently activated in the first terminal 100 which is matched with the second subscriber identification information set, that is, the first terminal 100 has the second subscriber identification information set. In other words, the management server 300 may search for subscriber identification information sets mapped with the second subscriber identification information set.

In operation S96, the management server 300 may transmit access path information of providing notification that there is the request to access the second subscriber identification information set to the first terminal 100 corresponding to the first subscriber identification information set.

In other words, in a case that the first terminal 100 activates the first subscriber identification information set, but the second terminal 200 requests to access the second subscriber identification information set, the management server 300 may allow the first terminal 100 to access a network using the activated first subscriber identification information set and may additionally provide information of providing notification that there is the request to access the second subscriber identification information set.

FIG. 10 is a sequence diagram illustrating a data flow of a method for providing a multi-number service according another embodiment.

Referring to FIGS. 1 to 4 and 10, in operation S100, a first terminal 100 may activate a first subscriber identification information set (e.g., a subscriber identification information set set1) among a plurality of subscriber identification information sets stored in a memory allocated to a subscriber identification information set managing application 14.

In operation S102, the first terminal 100 may register the first subscriber identification information set (e.g., the first subscriber identification information set set1) activated in operation S100 in a management server 300.

Operation S102 may be a process of registering a subscriber identification information set activated among the plurality of subscriber identification information sets to be monitored by the management server 300.

In operation S104, the management server 300 may receive terminal information of a second terminal 200 in corporate with a communication request to a second subscriber identification information set (e.g., a second subscriber identification information set set2) inactivated among the plurality of subscriber identification information sets of the first terminal 100 from the second terminal 200.

The terminal information may include identification information of the second terminal 200, for example, a phone number, an IMSI, an international mobile equipment identity (IMEI), an MSISDN, or the like.

In operation S106, the management server 300 may map and store the communication request from the second terminal 200 with the terminal information of the second terminal 200.

For example, the management server 300 may store information of providing notification that there is the communication request to the second subscriber identification information set (e.g., the subscriber identification information set set2) from the second terminal 200.

In operation S108, the management server 300 may search for the first subscriber identification information set (e.g., the first subscriber identification information set set1) currently activated in the first terminal 100 which is matched with the second subscriber identification information set (e.g., the second subscriber identification information set set2), for example, has the second subscriber identification information set (e.g., the second subscriber identification information set set2).

In other words, the management server 300 may store all subscriber identification information sets of the first terminal 100 in advance and may search for the first subscriber identification information set (e.g., the first subscriber identification information set set1) activated among subscriber identification information sets matched with the second subscriber identification information set (e.g., the second subscriber identification information set set2).

In operation S110, the management server 300 may transmit communication path information of providing notification that there is a request to access the second subscriber identification information set e.g., the subscriber identification information set set2) to the first terminal 100 corresponding to the first subscriber identification information set (e.g., the first subscriber identification information set set1).

In other words, in a case that the first terminal 100 activates the first subscriber identification information set (e.g., the first subscriber identification information set set1), but the request to access the second subscriber identification information set (e.g., the second subscriber identification information set set2) is received, the management server 300 may allow the first terminal 100 to access a network using the activated first subscriber identification information set (e.g., the first subscriber identification information set set1) and may additionally provide information of providing notification that there is a communication request to the second subscriber identification information set (e.g., the second subscriber identification information set set2).

In operation S112, the first terminal 100 may request to communicate with the second terminal 200.

According to embodiments, the communication request may be a voice call request or a message transmission request.

According to another embodiment, the management server 300 may additionally determine whether the communication request to the second terminal 200 at the first terminal 100 is a reply to the communication request of the second terminal 200 in operation S104. For example, the management server 300 may determine whether the communication request of the first terminal 100 is achieved within a reference time after the communication request of the second terminal 200.

In operation S114, the management server 300 may search for the communication request stored in operation S106 in response to the replay request from the first terminal. For example, the management server 300 may search for which subscriber identification information set of the first terminal 100 the second terminal 200 which is a counterpart requested to reply by the first terminal 100 has provided the communication request.

As a result of the search, since the second terminal 200 provides the communication request to the second subscriber identification information set (e.g., the second subscriber identification information set set2) in operation S104, in operation S116, the management server 300 may transmit a request to activate the second subscriber identification information set (e.g., the second subscriber identification information set set2) to the first terminal 100.

In operation S118, the first terminal 100 may activate the second subscriber identification information set (e.g., the subscriber identification information set set2) based on the request of the management server 300. In operation S120, the first terminal 100 may register the activated second subscriber identification information set (e.g., the second subscriber identification information set set2) in the management server 300.

In operation S122, the first terminal 100 may communicate with the second terminal 200 using the activated second subscriber identification information set (e.g., the second subscriber identification information set set2). In this case, the first terminal 100 may communicate with the second terminal 200 using a mobile communication network.

In operation S124, the first terminal 100 may verify a recovery condition of a subscriber identification information set.

According to an exemplary embodiment, in a case that the communication request to the second terminal 200 at the first terminal 100, that is, the reply is a voice call request, the recovery condition may be determined based on whether a reference time elapses after a voice call connection is terminated.

According to another embodiment, in a case that the communication request to the second terminal 200 at the first terminal 100, that is, the reply is a message transmission request, the recovery condition may be determined based on whether message transmission is completed.

When the recovery conditions are met, in operation S126, the first terminal 100 may activate the original first subscriber identification information set (e.g., the first subscriber identification information set set1). In operation S128, the first terminal 100 may register the activated first subscriber identification information set in the management server 300.

FIG. 11 is a sequence diagram illustrating a data flow of a method for providing a multi-number service according another embodiment.

Referring to FIGS. 1 to 4 and 11, in operation S130, a first terminal 100 may activate a first subscriber identification information set (e.g., a subscriber identification information set set1) among a plurality of subscriber identification information sets stored in a memory allocated to a subscriber identification information set managing application 14.

In operation S132, the first terminal 100 may receive terminal information of a second terminal 200 in corporate with a communication request to a second subscriber identification information set (e.g., a second subscriber identification information set set2) inactivated among the plurality of subscriber identification information sets of the first terminal 100 from the second terminal 200.

The terminal information may include identification information of the second terminal 200, for example, a phone number, an IMSI, an IMEI, an MSISDN, or the like.

In operation S134, the first terminal 100 may map and store the communication request from the second terminal 200 with the terminal information of the second terminal 200.

For example, the first terminal 100 may store information of providing notification that there is the communication request to the second subscriber identification information set (e.g., the subscriber identification information set set2) from the second terminal 200.

In operation S135, the first terminal 100 may communicate with the second terminal 200 via a mobile communication network based on the communication request of the second terminal 200.

In operation S136, the first terminal 100 may receive a communication request to the second terminal 200 input by its user.

According to an exemplary embodiment, the communication request may be a voice call request or a message transmission request.

According to another embodiment, the first terminal 100 may additionally determine whether the communication request is a reply to the communication request of the second terminal 200 in operation S132. For example, the first terminal 100 may determine whether the communication request of the first terminal 100 is achieved within a reference time after the communication request of the second terminal 200.

In operation S138, the first terminal 100 may search for the communication request stored in operation S134, based on the communication request input to the first terminal 100. For example, the first terminal 100 may search for which subscriber identification information set of the first terminal 100 the second terminal 200 which is a counterpart requested to reply by the first terminal 100 has provided the communication request.

As a result of the search, since the second terminal 200 provides the communication request to the second subscriber identification information set (e.g., the second subscriber identification information set set2) in operation S132, in operation S142, the first terminal 100 may activate the second subscriber identification information set (e.g., the subscriber identification information set set2).

According to an exemplary embodiment, in operation S140, the first terminal 100 may store a current state of the first terminal 100, for example, the currently activated subscriber identification information set (e.g., the first subscriber identification information set set1) between operation S138 and operation S142.

In operation S144, the first terminal 100 may communicate with the second terminal 200 using the activated second subscriber identification information set (e.g., the second subscriber identification information set set2). In this case, the first terminal 100 may communicate with the second terminal 200 using a mobile communication network.

In operation S146, the first terminal 100 may verify a recovery condition of a subscriber identification information set.

According to an exemplary embodiment, in a case that the communication request to the second terminal 200 at the first terminal 100, that is, the reply is a voice call request, the recovery condition may be determined based on whether a reference time elapses after a voice call connection is terminated.

According to another embodiment, in a case that the communication request to the second terminal 200 at the first terminal 100, that is, the reply is a message transmission request, the recovery condition may be determined based on whether message transmission is completed.

When the recovery conditions are met, in operation S148, the first terminal 100 may activate the original first subscriber identification information set (e.g., the first subscriber identification information set set1).

FIG. 12 is a drawing illustrating an example of an activation pattern input via a user interface (UI) of a terminal shown in FIG. 1. FIG. 13 is a drawing illustrating a UI according to an exemplary embodiment for receiving an identification number of a user after an activation pattern of FIG. 12 is input. FIG. 14 is a flowchart illustrating a method for providing a multi-number service according another embodiment.

Referring to FIGS. 1, 2, 12, and 14, a terminal 100 may include a display 110 for displaying a UI for receiving an external input from its user.

The display 110 may display a UI for receiving an activation pattern (e.g., a first activation pattern PT1) of the user to select and activate one of a plurality of subscriber identification information sets (e.g., first and second subscriber identification information sets set1 and set2, and the like).

According to an exemplary embodiment, the display 110 may display a plurality of pattern units PUs, each of which is implemented in the form of a dot.

As shown in FIG. 12, in operation S150, the user may input the first activation pattern PT1 which connects some of the plurality of pattern units PUs.

Referring to FIG. 13, after the first activation pattern PT1 is input, the display 110 may display a UI for receiving an identification number of the user.

According to an exemplary embodiment, the identification number may be a personal identification number (PIN).

In operation S152, the user may enter his or her identification number using a UI displayed on the display 110 of FIG. 13.

In operation S154, the terminal 100 may determine whether the identification input entered in operation S152 is an identification number corresponding to the first activation pattern PT1 input in operation S150, that is, whether a correct identification number is input.

For example, the terminal 100 may store a corresponding identification number for each specific activation pattern and may determine whether the entered identification number is identical to the stored identification number.

When the correct identification number is not entered, the terminal 100 may receive an activation pattern of the user again in operation S150.

When the correct identification number is entered, in operation S156, the terminal 100 may activate a subscriber identification information set corresponding to the input activation pattern.

FIG. 15 is a drawing illustrating another example of an activation pattern input via a UI of a terminal shown in FIG. 1.

Referring to FIGS. 12 to 15, a user may register a second activation pattern PT2 different from a first activation pattern PT1 in advance.

According to an exemplary embodiment, the terminal 100 may be configured to activate a first subscriber identification information set set1 when the first activation pattern PT1 is input thereto and activate a second subscriber identification information set set2 when the second activation pattern PT2 is input thereto.

In FIGS. 12 and 15, for convenience of description, an exemplary embodiment is exemplified as a plurality of pattern units PUs implemented in the form of a dot. However, various modifications are possible in the form of implementing the plurality of pattern units PUs. For example, the plurality of pattern units PUs may be implemented in a three-dimensional (3D) form.

According to an exemplary embodiment, an activation pattern (e.g., the first activation pattern PT1 or the second activation pattern PT2) input by the user may be a form of a voice pattern of the user. In this case, different subscriber identification information sets may be activated based on a voice pattern input by the user. The voice pattern may be input by a voice recognition module (e.g., a microphone) implemented in the terminal 100. For example, when the voice "apple" is input, the first subscriber identification information set set1 may be activated. When the voice "tomato" is input, the second subscriber identification information set set2 may be activated.

According to another embodiment, an activation pattern (e.g., the first activation pattern PT1 or the second activation pattern PT2) input by the user may be a form of a bio-information pattern of the user, for example, a fingerprint pattern of the user. In this case, different subscriber identification information sets may be activated based on a fingerprint pattern input by the user. The fingerprint pattern may be input by a fingerprint recognition module (not shown) implemented in the terminal 100. For example, when a fingerprint pattern of a first user is input, the first subscriber identification information set set1 may be activated. When a fingerprint pattern of a second user is input, the second subscriber identification information set set2 may be activated. In other words, several persons may activate their subscriber identification information sets using their unique information, thus receiving a service not to invade their privacy while sharing the one terminal 100. The bio-information pattern may be modified in various forms such as an iris pattern other than the fingerprint pattern.

FIG. 16 is a flowchart illustrating a method for providing a multi-number service according another embodiment.

Referring to FIGS. 1, 2, and 16, in operation S160, a user may store a corresponding terminal state for each of a plurality of subscriber identification information sets (e.g., first and second subscriber identification information sets set1 and set2 and the like) stored in a memory allocated to the subscriber identification information set managing application 14 of the terminal 100.

According to an exemplary embodiment, the terminal state may be a communication establishment state of the terminal 100. For example, the communication establishment state may include at least one of whether a data network is connected, whether wireless-fidelity (Wi-Fi) is connected, whether a global positioning system (GPS) is connected, whether near field communication (NFC) is connected, and whether Bluetooth is connected.

For example, the user may use the first subscriber identification information set set1 in a home where the Wi-Fi is available to him or her. The user may use the second subscriber identification information set set2 in the outside where the Wi-Fi is unavailable to him or her. In this case, if the first subscriber identification information set set1 is activated, the Wi-Fi is connected and the data network is blocked. Also, if the second subscriber identification information set set2 is activated, the Wi-Fi is blocked and the data network is connected.

According to another embodiment, the terminal state may be a notification mode setting state of the terminal 100. For example, the notification mode setting state may be an alarm mode, a ring mode, a vibrate mode, or a silent mode.

The vibrate mode may refer to a mode of providing notification that an event occurs through vibration, and a manner mode may correspond to the vibration mode.

The silent mode may refer to a mode of preventing notification that an event occurs from being provided to the outside although the event occurs. An airplane mode or the like may correspond to the silent mode.

For example, the user may use the first subscriber identification information set set1 at his or her company. The user may use the second subscriber identification information set set2 at the other places. In this case, if the first subscriber identification information set set1 is activated, the terminal 100 may set to the vibration mode. Also, if the second subscriber identification information set set2 is activated, the terminal 100 may be set to the ring mode.

According to an exemplary embodiment, the terminal state may be an initial screen setting state of the terminal 100. For example, the initial screen setting state may include at least one of a list and arrangement of at least one application icon displayed on an initial screen, a background image of the initial screen, and whether a lock of the initial screen is set.

For example, the user may use the first subscriber identification information set set1 at his or her company and may use the second subscriber identification information set set2 at the other places. The terminal 100 may be configured to display an icon of a text editing application frequently used at the company on the initial screen when the first subscriber identification information set sea is activated. Also, the terminal 100 may be configured to display an icon of a game application frequently used at a home of the user on the initial screen when the second subscriber identification information set set2 is activated.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims. Accordingly, the scope of the inventive concept should be determined only according to the attached claims.

The invention claimed is:

1. A method for providing a multi-number service using a smart card, the method comprising:

selecting one of a plurality of subscriber identification information sets, stored in a memory allocated to a subscriber identification information set managing application, based on a command received from outside of the smart card;

activating the selected subscriber identification information set;

receiving, by a terminal, a list of at least one subscriber identification information set search and transmitted by a management server based on an add request of the subscriber identification information set; and storing, by the terminal, a subscriber identification information set selected based on the list of the at least one subscriber identification information set, in the memory allocated to the subscriber identification information set managing application of the smart card, and wherein the plurality of subscriber identification information sets includes mandatory files, the mandatory files for accessing a mobile communication network including at least an Integrated Circuit Card ID (ICCID) and a key information for a network access, a name of a user being managed based on the ICCID, wherein the activating the selected subscriber identification information set activates the subscriber identification information set by updating the selected subscriber identification information set to a universal integrated circuit card (UICC) file system in the smart card based on the command, and wherein an information included in the subscriber identification information set is updated to file entries of the UICC file system through a universal subscriber identity module (USIM) application to constitute a part or all of file information of the UICC file system.

2. The method of claim 1, further comprising:
setting, an accredited certificate corresponding to an ICCID of the activated subscriber identification information set as a default accredited certificate based on the activated subscriber identification information set.

3. The method of claim 1, wherein the memory card is UICC.

4. A method for providing a multi-number service using a smart card, the method comprising:
selecting one of a plurality of subscriber identification information sets, stored in a memory allocated to a subscriber identification information set managing application, based on a command received from outside of the smart card;
activating the selected subscriber identification information set;
receiving, by a terminal, a list of at least one subscriber identification information set search and transmitted by a management server based on a delete request of subscriber identification information set; and
deleting, by the terminal, a subscriber identification information set selected based on the list of the at least one subscriber identification information set from the memory allocated to the subscriber identification information set managing application of the smart card,
wherein the plurality of subscriber identification information sets includes mandatory files, the mandatory files for accessing a mobile communication network including at least an Integrated Circuit Card ID (ICCID) and a key information for network access, a name of a user being managed based on the ICCID,
wherein the activating the selected subscriber identification information set activates the subscriber identification information set by updating the selected subscriber identification information set to a universal integrated circuit card (UICC) file system in the smart card, the subscriber identification set being selected based on the command, and
wherein an information included in the subscriber identification information set is updated to file entries of the UICC file system through a universal subscriber identity module (USIM) application to constitute a part or all of file information of the UICC file system.

5. The method of claim 4, further comprising:
setting, an accredited certificate corresponding to an ICCID of the activated subscriber identification information set as a default accredited certificate based on the activated subscriber identification information set.

6. The method of claim 4, wherein the memory card is UICC.

7. A method for providing a multi-number service, the method comprising:
registering, by a management server, a plurality of subscriber identification information sets stored in a memory allocated to a subscriber identification information set managing application of a smart card of a first terminal;
searching for, by the management server, a response corresponding to a subscriber identification information set requested to be accessed by a second terminal among the plurality of registered subscriber identification information sets; and
transmitting, by the management server, the search response to the second terminal, wherein the plurality of subscriber identification information sets includes mandatory files, the mandatory files for accessing a mobile communication network including at least an Integrated Circuit Card ID (ICCID) and a key information for a network access, a name of a user being managed based on the ICCID,
wherein the searching for the response includes searching for a subscriber identification information set activated in the first terminal,
wherein the activated subscriber identification information set corresponds to a subscriber identification information set activated by updating, by the first terminal, the selected subscriber identification information set to a universal integrated circuit card (UICC) file system in the smart card, the subscriber identification information set being selected based on a command received from an outside of the smart card, and
wherein an information included in the subscriber identification information set is updated to file entries of the UICC file system through a universal subscriber identity module (USIM) application to constitute a part or all of file information of the UICC file system.

8. The method of claim 7, wherein the response is a message or a ring-back tone.

9. A method for providing a multi-number service, the method comprising:
registering, by a management server, a first subscriber identification information set activated among a plurality of subscriber identification information sets stored in a memory allocated to a subscriber identification information set managing application of a smart card of a first terminal;
receiving, by the management server, a request to access a second subscriber identification information set from a second terminal; and
transmitting, by the management server, a request to activate the second subscriber identification information set to the first terminal,
wherein the plurality of subscriber identification information sets includes mandatory files, the mandatory files for accessing a mobile communication network including at least an Integrated Circuit Card ID (ICCID) and a key information for a network access, a name of a user being managed based on the ICCID,
wherein the second subscriber identification information set is activated by updating the selected subscriber identification information set to a universal integrated circuit card (UICC) file system in the smart card, the subscriber identification information set being selected based on a command from an outside, and
wherein an information included in the second subscriber identification information set is updated to file entries of the UICC file system through a universal subscriber identity module (USIM) application to constitute a part or all of file information of the UICC file system.

10. A method for providing a multi-number service, the method comprising:
registering, by a management server, a first subscriber identification information set activated among a plurality of subscriber identification information sets stored in a memory allocated to a subscriber identification information set managing application of a smart card of a first terminal;
receiving, by the management server, a request to access a second subscriber identification information set from a second terminal; and transmitting, by the management server, an access path information noticing a request to access the second subscriber identification information set, to the first terminal, wherein the plurality of subscriber identification information sets includes mandatory files, the mandatory files for accessing a mobile communication network including at least an Integrated Circuit Card ID (ICCID) and a key information for a network access, a name of a user being managed based on the ICCID, wherein the second subscriber identification information set is activated, by the first terminal, by updating the second subscriber identification information set to a universal integrated circuit card (UICC) file system in the smart card based on the access path information, and wherein an information included in the second subscriber identification information set is updated to file entries of the UICC file system through the USIM application that constitutes a part or all of file information of the UICC file system.

* * * * *